US006311575B1

(12) United States Patent
Erker

(10) Patent No.: US 6,311,575 B1
(45) Date of Patent: Nov. 6, 2001

(54) DEVICE FOR CONNECTING TOGETHER A BALL NUT AND MOVING MEMBER

(75) Inventor: Gerald F. Erker, Sterling Heights, MI (US)

(73) Assignee: Tesco Engineering, Inc., Auburn Hills, MI (US)

( * ) Notice: Subject to any disclaimer, the term of this patent is extended or adjusted under 35 U.S.C. 154(b) by 0 days.

(21) Appl. No.: 09/534,107

(22) Filed: Mar. 23, 2000

(51) Int. Cl.[7] .................................................. F16H 27/02
(52) U.S. Cl. .......................................... 74/89.36; 74/89.42
(58) Field of Search ................................ 74/89.36, 89.42

(56) References Cited

U.S. PATENT DOCUMENTS

| | | | |
|---|---|---|---|
| 3,486,393 | * 12/1969 | Maxwell | 74/89.36 |
| 3,934,483 | * 1/1976 | Lüthi | 74/89.36 |
| 4,633,732 | * 1/1987 | Nishikawa et al. | 74/89.36 |
| 5,172,601 | * 12/1992 | Siegrist et al. | 74/89.42 |
| 5,473,958 | * 12/1995 | Jeck et al. | 74/89.36 |

* cited by examiner

Primary Examiner—David Fenstermacher
(74) Attorney, Agent, or Firm—Fildes & Outland, P.C.

(57) ABSTRACT

A device for slip-fittably connecting together a ball nut and a moving member moved by the ball nut includes a first connecting member fixedly attached to the ball nut. The first connecting member has first registration elements disposed radially opposite relative to the ball nut. A second connecting member is fixedly attached to the moving member. The second connecting member has cooperative second registration elements disposed radially opposite relative to the ball nut which cooperate with the first radially opposite registration elements. The first and second registration elements are slip-fittably connectable together and provide indexed registration within predetermined tolerances in the axial, radial and circumferential directions relative to the ball nut.

8 Claims, 1 Drawing Sheet

DEVICE FOR CONNECTING TOGETHER A BALL NUT AND MOVING MEMBER

FIELD OF THE INVENTION

This invention relates to ball screw drives and more particularly to slip-fittably connecting a ball nut to a moving member for movement of the moving member by the ball nut without a fixed connection.

BACKGROUND OF THE INVENTION

It is known in the art relating to linear ball screw drives to fixedly connect the ball nut to a moving member in order to move the moving member by the actuation of a ball screw that drives the ball nut. With such an arrangement, the rigid connection between the ball nut and moving member can cause excessive wear on the ball screw and premature failure of the ball nut.

In closure panel hemming operations large loads are applied by linear ball screw drives drawing upper and lower dies together to edge hem preformed metal panels. In such operations, there is a need to maximize ball screw life and reduce the failure rate of ball nuts used to move the dies.

SUMMARY OF THE INVENTION

The present invention provides a device for slip-fittably connecting together a ball nut and a moving member moved by the ball nut. The device includes a first connecting member fixedly attached to the ball nut. The first connecting member has first registration elements disposed radially opposite relative to the ball nut. A second connecting member is fixedly attached to the moving member. The second connecting member has cooperative second registration elements disposed radially opposite relative to the ball nut which cooperate with the first radially opposite registration elements.

The first and second registration elements are slip-fittably connectable together and provide indexed registration within predetermined tolerances in the axial, radial and circumferential directions relative to the ball nut.

In one embodiment of the invention, the first radially opposite registration elements are defined by radially extending wings. Each radially extending wing includes an upper and a lower load block for axial indexing and also an anti-rotate block for circumferential and radial indexing. Preferably, the upper and lower load blocks each have a crowned loading surface.

The cooperative second radially opposite registration elements each include opposed wear plates for capturing the upper and lower load blocks between opposed surfaces of the wear plates of each registration element, thereby indexing the axial movement. Radially opposed wear plates of opposite registration elements capture the anti-rotate blocks between inwardly facing edges, thus indexing radial and circumferential movement.

A method for connecting together a ball nut and a moving member moved by the ball nut, comprises the steps of:

fixedly attaching a first connecting member including first registration elements disposed radially opposite relative to the ball nut;

fixedly attaching to the moving member a second connecting member including cooperative second registration elements disposed radially opposite relative to the ball nut; and slip-fittably connecting together the first and second registration elements to provide indexed registration within predetermined tolerances in the axial, radial and circumferential directions relative to the ball nut.

These and other features and advantages of the invention will be more fully understood from the following detailed description of the invention taken together with the accompanying drawings.

DETAILED DESCRIPTION OF THE INVENTION

Figure 1:
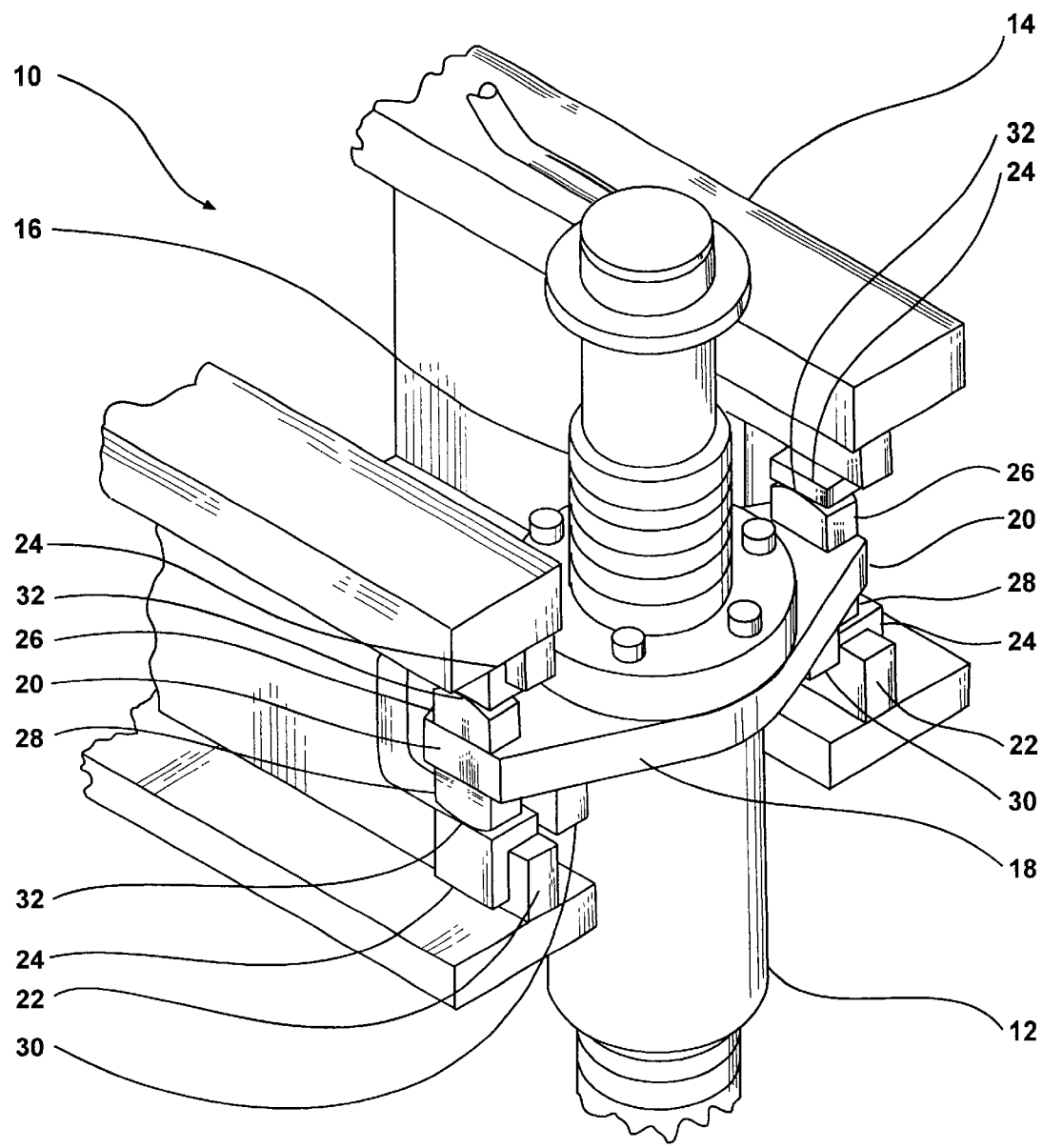
FIG. 1 is an enlarged perspective view of a moving member, a ball screw, a ball nut and a device for slip-fittingly connecting together the ball nut and moving member to provide a floating connection.

Referring now to the drawings in detail, numeral 10 generally indicates a device for slip-fittingly connecting together a ball nut 12 and a moving member 14. As is hereinafter more fully described, device 10 provides a floating connection of a ball nut and moving member and eliminates the conventional problems that arise when the ball nut is fixedly connected to the moving member.

As shown in FIG. 1, ball nut 12 is driven in a linear, hereinafter referred to as the axial, direction by the rotation of a ball screw 16. The moving member 14 is moved by the ball nut 12 as the ball nut is moved by the ball screw 16. As illustrated in FIG. 1, the moving member 14 is a closure panel hemming die mounting platen or a closure panel hemming die used for hemming preformed metal panels. The moving member 14 forms part of a closure panel hemming machine of the type using ball screw actuators for drawing the hemming dies together.

With continued reference to FIG. 1, a first connecting member 18 is fixedly attached to the ball nut 12. In the illustrated embodiment, the first connecting member 18 includes first registration elements 20 disposed radially opposite relative to the ball nut 12. A second connecting member 22 is fixedly attached to the moving member 14. The second connecting member 22 includes cooperative second registration elements 24 disposed radially opposite relative to the ball nut.

The first and second registration elements 20,24 are slip-fittably connectable together and provide indexed registration of the moving member 14 within predetermined tolerances in the axial, radial and circumferential directions relative to the ball nut 12.

In the illustrated embodiment, the first radially opposite registration elements 20 are defined by radially extending wings. Each wing 20 mounts an upper 26 and a lower 28 load block for axial indexing and also an anti-rotate block 30 for circumferential and radial indexing of the ball nut 12 relative to the moving member 14. Preferably, the upper 26 and lower 28 load blocks each have a crowned loading surface 32 which facilitates tolerance control and the non-fixed, floating connection.

The cooperative second radially opposite registration elements 24 are defined by opposed wear plates for axially capturing the upper 26 and lower 28 load blocks within predetermined tolerances. The opposed wear plates on opposite registration elements 24 circumferentially and radially capture the anti-rotate blocks within predetermined tolerances.

The first connecting member may be integral with the ball nut and the second connecting member may be integral with the moving member.

A method for connecting together a ball nut and a moving member moved by the ball nut includes the steps of:

fixedly attaching a first connecting member including first registration elements disposed radially opposite relative to the ball nut;

fixedly attaching to the moving member a second connecting member including cooperative second registration elements disposed radially opposite relative to the ball nut; and slip-fittably connecting together said first and second registration elements to provide indexed registration within predetermined tolerances in the axial, radial and circumferential directions relative to the ball nut.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A device for connecting together a ball nut and a moving member moved by the ball nut, said device comprising:

a first connecting member fixedly attached to the ball nut;

said first connecting member including first registration elements disposed radially opposite relative to the ball nut;

a second connecting member fixedly attached to the moving member;

said second connecting member including cooperative second registration elements disposed radially opposite relative to the ball nut;

said first and second registration elements being slip-fittably connectable together and providing indexed registration within predetermined tolerances in the axial, radial and circumferential directions relative to the ball nut.

2. The device of claim 1 wherein said first radially opposite registration elements are defined by radially extending wings.

3. The device of claim 2 wherein said radially extending wings each include an upper and lower load block for axial indexing and also an anti-rotate block for circumferential and radial indexing.

4. The device of claim 3 wherein said upper and lower load blocks each have a crowned loading surface.

5. The device of claim 3 wherein said cooperative second radially opposite registration elements each include opposed wear plates for capturing said upper and lower load blocks and said anti-rotate blocks.

6. The device of claim 1 wherein said first connecting member is integral with said ball screw.

7. The device of claim 1 wherein said second connecting member is integral with said moving member.

8. A method for connecting together a ball nut and a moving member moved by the ball nut, said method comprising the steps of:

fixedly attaching a first connecting member including first registration elements disposed radially opposite relative to the ball nut;

fixedly attaching to the moving member a second connecting member including cooperative second registration elements disposed radially opposite relative to the ball nut; and slip-fittably connecting together said first and second registration elements to provide indexed registration within predetermined tolerances in the axial, radial and circumferential directions relative to the ball nut.

* * * * *